July 20, 1965   A. A. BERNSTEIN   3,195,510
INSECT PROTECTED BIRD AND ANIMAL FEEDER
Filed June 1, 1964   2 Sheets-Sheet 1

INVENTOR.
Albert A. Bernstein

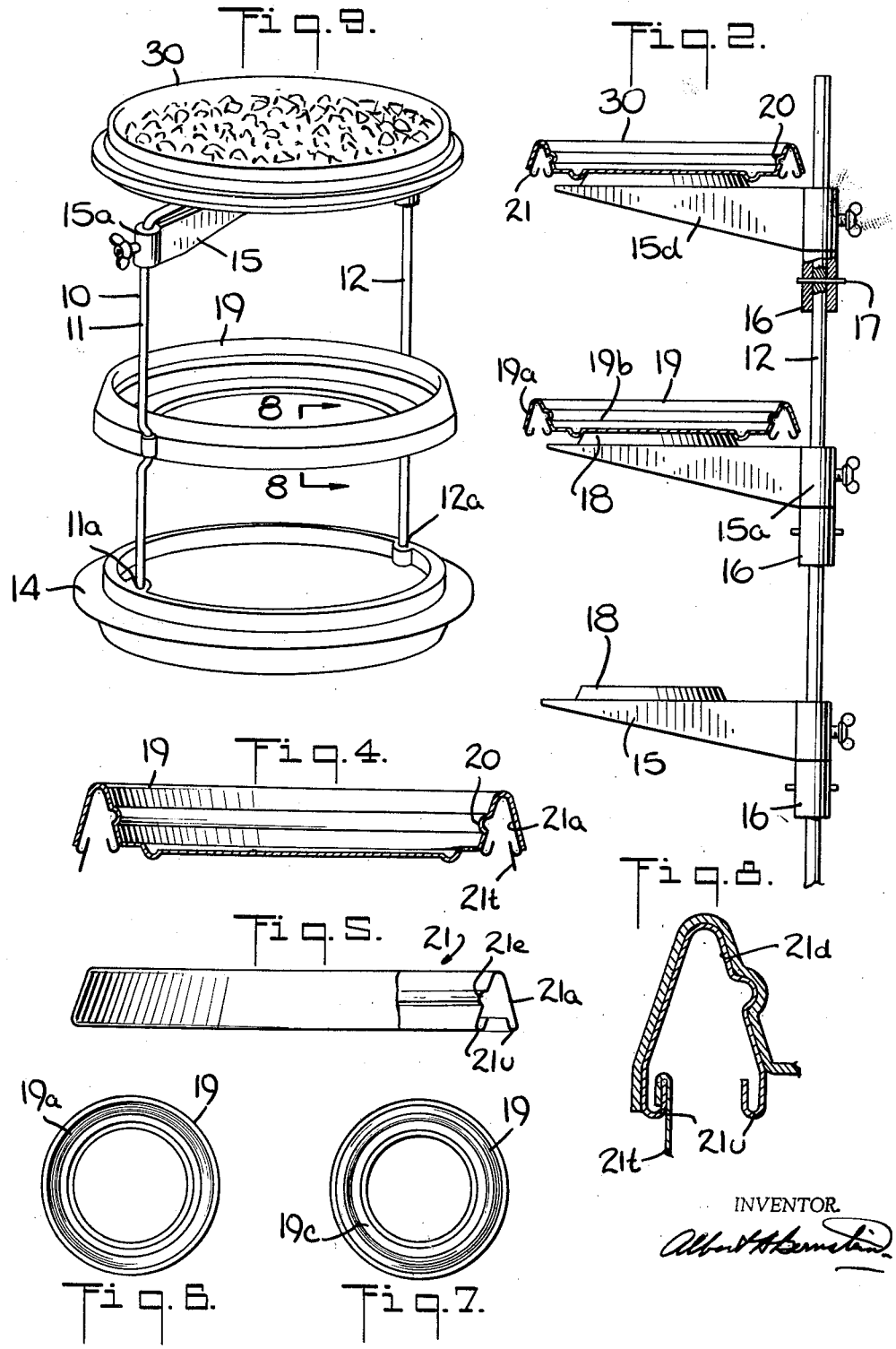

United States Patent Office 3,195,510
Patented July 20, 1965

3,195,510
INSECT PROTECTED BIRD AND ANIMAL FEEDER
Albert A. Bernstein, 49 Cranberry St., Brooklyn 2, N.Y.
Filed June 1, 1964, Ser. No. 371,535
3 Claims. (Cl. 119—61)

This invention relates to a combined food and water dispenser for pet and animal service, and particularly relates to a construction developed to trap crawling insects and to exterminate them by the use of a guarded insecticide, and to protect the pets and animals from contact with this insecticide.

It is well known in this art that insects avoid movement toward a source of food, if water is placed in the normal path of movement of the insects, but experience shows that water itself does not trap and exterminate the insects, and an insecticide can only be used when the water and food supply are effectively protected from the insecticide, and handling of the holding device and food and water containers does not expose the person engaged in this handling to direct contact with the insecticide.

One of the objects of the present invention is to provide a water container with an insecticide trap, which is easily coupled to the underside of the container, and which will trap and poison insects crawling against the underside of the container, and which can be readily detached by the person handling the container and the insecticide trap or carrier, without exposing the fingers to direct contact with the poisonous insecticide.

Another object of the invention is to provide a water or food container with a pendant external flange or wall which provides a U-shaped annular channel around the container and to provide an insect trap in this channel, which snaps into the channel and latches to the container to retain its position in this channel, and which trap is provided with a coating of insecticide material which is normally tacky or adhesive and is constructed with drainage or drip receiving edge troughs to receive drippings from the coated trap, and further provided with pull tabs for removing the trap from the container it is coupled to.

Another object of the invention is to provide a wire frame support on which an open water dish or container may be supported and a separate food dish or container also supported, preferably at a higher level or over the water container, and the wire frame supported on its base 13a or hung upon a wall or other fastener or support, so that birds may partake of the water or food.

Another object of the invention is the provision of small roosting supports 32 coiled as at 32a on the wire frame uprights, upon which visiting birds may rest or perch, which can be readily slipped on these frame uprights and readily removed.

With the above and other objects in view, the invention relates to certain further objects, constructions and details and combinations thereof, shown in the accompanying drawings and described and claimed in the following specification thereof, and in the drawings:

FIG. 2 is a side view of a modified container arrangement.

FIG. 4 is another similar view on a smaller scale.

FIG. 5 is a side elevation of a container.

FIG. 6 is a bottom plan view of a container.

FIG. 7 is a top plan view thereof.

FIG. 8 is an enlarged detail sectional view showing the interlocking coupling between the insect trap and the dish or container taken along the lines 8—8 of FIG. 9.

FIG. 9 is a perspective view of the device.

Figure 1:
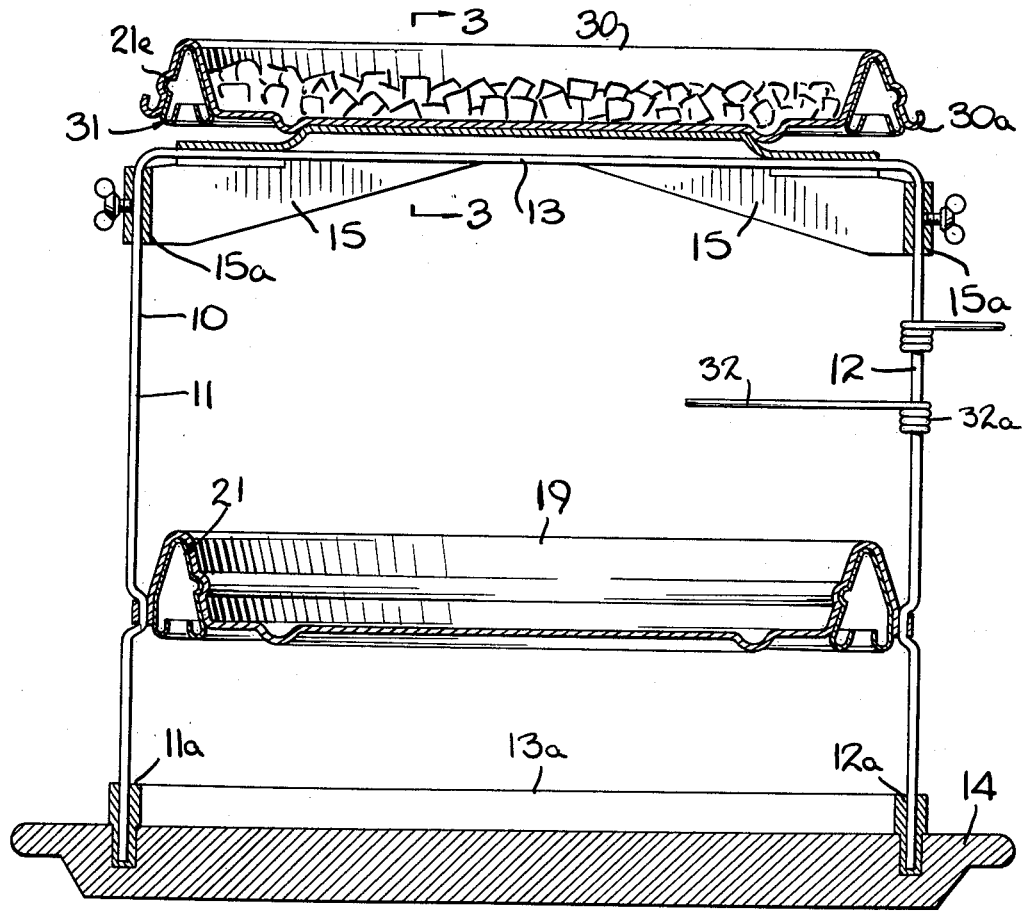
FIG. 1 is a vertical sectional view showing two containers supported on the upright bars of the wire frame.
Figure 3:
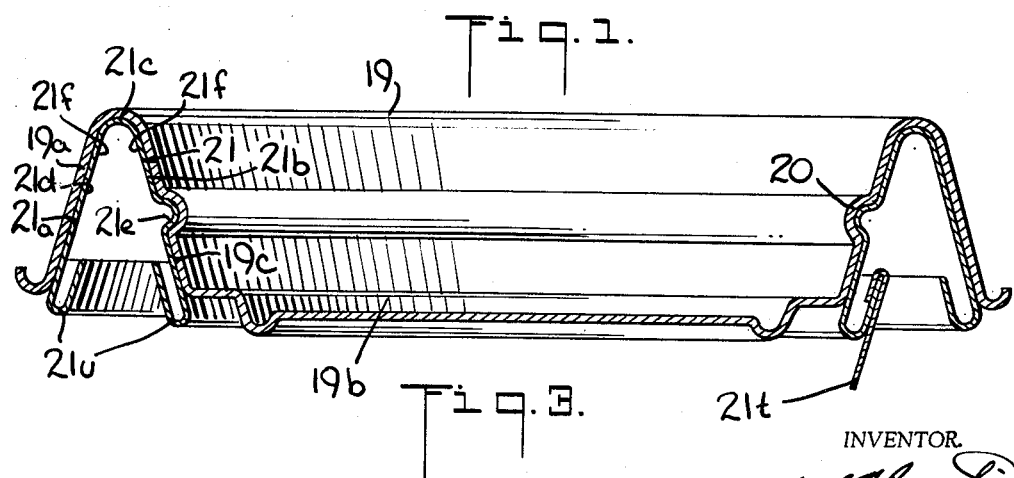
FIG. 3 is an enlarged horizontal sectional view of one of the containers taken along lines 3—3 of FIG. 1.

Referring to the accompanying drawings 10 designates an inverted U-shaped wire frame having vertical bars 11 and 12 and a connecting cross bar 13, which is shown to be disposed on the upper ends of the vertical side bars 11 and 12. This wire frame has straight ends for the side bars 11 and 12, which can be inserted in sockets 11a and 12a formed in the wood or other base 14.

On the side bars 11 and 12 cantilever bracket members 15 are mounted, each bracket member having a socket 15a on its inner end which snugly engages its side frame bar, and each bracket arm engages a stop sleeve 16 slidable on the side arm, and which can be secured against sliding by the slip pin 17, inserted in registering holes formed in the socket or sleeve 16 and in the engaged side bar.

The outer end portion of the bracket member is formed with an annular seat 18, in fact this seat extends to and is formed with the companion bracket member, and projects upwardly to center the container 30 on the shelf structure thus provided.

The container 19 is shown to be circular and is provided with a bounding and pendant outward wall 19a, which is spaced apart from the bowl 19b of the container to provide a channel 19c around the bowl 19b and under the marginal rim 19c of the container. This bowl is formed with an external formed or spun bead 20 and into the annular channel 19c the insecticide trap 21 is forcibly inserted. This trap 21 is constructed of plastic or paper and is provided with an outer wall 21a and an inner wall 21b, which are connected to each other by the joint 21c, and thus provides a circumscribing guard or trap, which is of V-shaped contruction in cross section. The outer wall 21a is formed with a bead or latching element 21e, which is designed to snap into the bead 20 and couple the insecticide trap in the annular channel. The inner faces 21f of the opposing and downwardly divergent walls of the trap are coated with a gelatinous insecticide 21d, which remains tacky or adhesive for a long period of time, and which is charged with an insect poisonous preparation, approved for such use.

To remove the insecticide trap 21 from its channel I attach one or more pull tabs 21t to the side of the trap, so that any person, child or adult may detach the trap from the bird or pet serving vessel. In this way the handler avoids exposing the fingers to any of the insecticide, or animal waste deposited on the trap 21.

Insects crawling along the pendant marginal wall or flange 19a will be forced to crawl over the gelatinous surface of the trap and be anchored to the insecticide against further movement. If the container and the trap are exposed to the temperature of a heated kitchen or other place, some of the adhesive insecticide may drip and the lower receiving troughs 21u will collect this dripping, so that none of it will be exposed to the bills of birds wandering around the container and trap. Should any insects crawl between the trap and the container walls they will probably become wedged against withdrawal and die as trapped.

The upper food container 30 may be similarly constructed. The food container is, therefore, provided with a pendant outer or marginal wall or flange 30a, and equipped with an insect trap 31, disposed in the channel within the wall or flange 30a, in the manner described with reference to the water container.

It is understood that various changes may be made in carrying out the invention for practical uses, without departing from the invention as defined by the claims hereof.

Having described my invention I claim as patentable:
1. A pet feeding device, comprising a wire frame having upright supporting bars, brackets mounted on each bar, a seat member connecting the brackets to each other and provided with an upstanding circular seat, a container having a bowl engaged on and centered by said seat, and an insect trap enclosing the bowl and provided with a tacky insecticide on its inner surface and having a V-shaped cross sectional construction.

2. A pet feeding water container having a bowl and a rim extending outwardly from the bowl, a wall depending from the rim and spaced apart from the bowl to provide a channel bounding said bowl, an insecticide trap disposed in the channel and having a V-shaped cross section to provide divergent walls, a coating of tacky insecticide material on said trap, said trap having on its lower edges a trough to receive drippings from said insecticide material, said bowl having a wall provided with a bead and the trap having a side wall provided with a bead interfitted in said bowl bead.

3. A pet feeder having a pendant outer wall and a bowl disposed within said outer wall, a circular trap disposed between said outer wall and the bowl including divergent walls, each wall having on its inner face a coating of tacky insecticide material, and means for coupling the trap to the wall of the bowl to prevent the trap from dropping below the bowl.

References Cited by the Examiner

UNITED STATES PATENTS

| | | | |
|---|---|---|---|
| 552,644 | 1/96 | Matthews | 43—114 |
| 731,843 | 6/03 | Bierley | 43—114 |
| 1,112,064 | 9/14 | Gordon | 43—114 |
| 2,584,301 | 2/52 | Sinclair | 119—61 |
| 2,618,238 | 11/52 | Travis | 119—61 X |
| 2,677,350 | 5/54 | Prestidge et al. | 119—61 |
| 2,928,372 | 3/60 | Farley | 119—61 |

SAMUEL KOREN, *Primary Examiner.*

ALDRICH F. MEDBERY, *Examiner.*